US011380058B2

(12) United States Patent
North et al.

(10) Patent No.: US 11,380,058 B2
(45) Date of Patent: Jul. 5, 2022

(54) METHOD AND APPARATUS FOR CONTINUITY BASED SMOOTHING

(71) Applicant: Autodesk, Inc., San Rafael, CA (US)

(72) Inventors: Nicholas Stewart North, Vineyard, UT (US); Adam Michael Helps, Provo, UT (US)

(73) Assignee: Autodesk, Inc., San Rafael, CA (US)

( * ) Notice: Subject to any disclaimer, the term of this patent is extended or adjusted under 35 U.S.C. 154(b) by 101 days.

(21) Appl. No.: 17/070,592

(22) Filed: Oct. 14, 2020

(65) Prior Publication Data

US 2021/0110603 A1 Apr. 15, 2021

Related U.S. Application Data

(60) Provisional application No. 62/914,829, filed on Oct. 14, 2019.

(51) Int. Cl.
*G06T 17/20* (2006.01)
*B33Y 50/02* (2015.01)
(Continued)

(52) U.S. Cl.
CPC .............. *G06T 17/20* (2013.01); *B33Y 50/02* (2014.12); *G06T 17/30* (2013.01); *G06T 19/20* (2013.01)

(58) Field of Classification Search
CPC ......... G06T 17/20; G06T 17/30; G06T 19/20; G06T 17/205; B33Y 50/02
See application file for complete search history.

(56) References Cited

U.S. PATENT DOCUMENTS 8,749,543 B2\* 6/2014 Huang .................... G06T 13/00
345/428
9,741,146 B1\* 8/2017 Nishimura .............. G06T 13/40
(Continued)

OTHER PUBLICATIONS

Autodesk.com [online], "Oct. 15, 2018 Product Update—What's New", published on Oct. 15, 2018, [retrieved on Oct. 1, 2019], retrieved from URL<https://www.autodesk.com/products/fusion-360/blog/october-15-2018>, 36 pages.
(Continued)

*Primary Examiner* — Said Broome
(74) *Attorney, Agent, or Firm* — Fish & Richardson P.C.

(57) ABSTRACT

Methods, systems, and apparatus, including medium-encoded computer program products, for computer aided design of physical structures include, in one aspect, a method for increasing smoothness between a set of adjoining surface patches includes: identifying surface patches corresponding to a portion of a modeled surface to be smoothed, where the surface patches are defined by control vertices from a control mesh; smoothing the portion of the modeled surface based on continuity, where the smoothing includes determining a continuity measure at an interface between each pair of adjoining surface patches, and modifying positions of a subset of the control vertices, thereby modifying the surface patches, by targeting an overall improvement in the continuity measures for the interfaces, while also targeting an overall minimum of modification of positions of the control vertices; and processing the modified positions of the subset of the control vertices within the modelled surface for output.

20 Claims, 7 Drawing Sheets

(51) Int. Cl.
*G06T 19/20* (2011.01)
*G06T 17/30* (2006.01)

(56) References Cited

U.S. PATENT DOCUMENTS

| | | | | |
|---|---|---|---|---|
| 9,990,754 B1* | 6/2018 | Waterson | ............... | G06T 19/20 |
| 10,424,112 B2 | 9/2019 | Schmidt | | |
| 2008/0316202 A1* | 12/2008 | Zhou | ............... | G06T 17/20 |
| | | | | 345/419 |
| 2010/0277571 A1* | 11/2010 | Xu | ............... | G06T 17/00 |
| | | | | 348/47 |

OTHER PUBLICATIONS

Autodesk.com [online], "Nov. 28, 2018 Product Update—What's New—Fusion 360 Blog", published on Nov. 28, 2018 [retrieved on Oct. 14, 2019], retrieved from URL< https://www.autodesk.com/products/fusion-360/blog/november-28-2018-product-update-whats-new/>, 25 pages.

Chen et al., "Rational Bezier Patch Differentiation using the Rational Forward Difference Operator", International 2005 Computer Graphics, 2005, pp. 129-134.

Elsey et al., "Analogue of the Total Variation Denoising Model in the Context of Geometry Processing", Multiscale Modeling and Simulation, 2009, 7(4):1549-1573.

Fleishman et al., "Bilateral Mesh Denoising", ACM Siggraph 2003, pp. 950-953.

Jones et al., "Non-Iterative, Feature-Preserving Mesh Smoothing", Siggraph, 2003, pp. 943-949.

Kingma et al., "ADAM: A Method for Stochastic Optimization", arXiv:1412.6980v9, Jan. 2017, 15 pages.

Nealen et al., "Laplacian Mesh Optimization" Proceedings of the 4th International Conference on Computer Graphics and Interactive Techniques in Australasia and Southeast Asia, 2006, pp. 381-389.

Ruder, "An overview of gradient descent optimization algorithms", arXiv:1609.04747v2, Jun. 2017, 14 pages.

Wikipedia.org [online], "Bezier surface", published on Nov. 2, 2018, [retrieved on Oct. 9, 2019], retrieved from URL<https://en.wikipedia.org/wiki/B%C3%A9zier_surface>, 3 pages.

Wikipedia.org [online], "Boundary representation", published on Jan. 2018, [retrieved on Oct. 9, 2019], retrieved from URL<https://en.wikipedia.org/wiki/boundary_representation>, 4 pages.

Wikipedia.org [online], "Non-uniform rational B-spline", published on Sep. 7, 2019, [retrieved on Oct. 9, 2019], retrieved from URL<https://en.wikipedia.org/wiki/Non-uniform_rational_B-spline>, 12 pages.

Wikipedia.org [online], "Polygon Mesh", published on Oct. 6, 2019, [retrieved on Oct. 9, 2019], retrieved from URL<https://en.wikipedia.org/w/index.php?title=polygon_mesh&oldid=919818495>, 12 pages.

Wikipedia.org [online], "Subdivision surface", published on Sep. 6, 2019, [retrieved on Oct. 9, 2019], retrieved from URL<https://en.wikipedia.org/w/index.php?title=Subdivision_surface&oldid-914328750>, 5 pages.

Wikipedia.org [online], "T-spline", published on Dec. 9, 2019, [retrieved on Oct. 9, 2019], retrieved from URL<https://en.wikipedia.org/w/index.php?title=T-spline&oldid=872857594>, 2 pages.

* cited by examiner

METHOD AND APPARATUS FOR CONTINUITY BASED SMOOTHING

CROSS-REFERENCE TO RELATED APPLICATIONS

This application claims the benefit under 35 U.S.C. § 119(e) of U.S. Patent Application No. 62/914,829, entitled "METHOD AND APPARATUS FOR CONTINUITY BASED SMOOTHING", filed Oct. 14, 2019, which is incorporated herein by reference in its entirety.

BACKGROUND

This specification relates to surface modelling in computer graphics applications, such as computer generated animation and computer aided design of physical structures to be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to manufacture the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modelled 3D object. In a B-Rep model (often referred to as simply a B-Rep), geometry is stored in the computer using smooth and precise mathematical surfaces, in contrast to the discrete and approximate surfaces of mesh model geometry, which can be difficult to work with in a CAD program. Other types of smooth surface models used in CAD programs include Non-Uniform Rational Basis Splines (NURBS), T-Splines, and Subdivision (SubDiv) Surfaces.

CAD software has been used in conjunction with subtractive manufacturing systems and techniques, such as CNC machine cutting, electrode discharge machining, chemical machining, and waterjet machining. CAD software has also been used in conjunction with additive manufacturing systems and techniques, also known as solid free form fabrication or 3D printing, such as Fused Filament Fabrication (FFF) and Selective Laser Sintering (SLS). In addition, CAD software has been designed so as to perform automatic generation of 3D geometry (generative design) for a part or one or more parts in a larger system of parts to be manufactured. The output from generative design algorithms is typically a discretized polygon mesh, similar to the output from object scanning systems and techniques.

To be useable in a CAD program, such polygon meshes are typically converted into modelled surfaces composed of a control mesh and control vertices that define smooth surface patches of the complex modelled surface, e.g., a polygon mesh is converted into a complex T-Spline surface model. But even though the individual surface patches are smooth and precise mathematical surfaces, the larger complex surface model is often rather bumpy. Moreover, traditional approaches to smoothing 3D surface models often do not work well with such complex surfaces because typical smoothing methods (e.g., Gaussian blur operations, wavelet smoothing, or Fourier smoothing) operate by reducing the high-frequency variation of the input surfaces, which results in loss of details in the complex modelled surface.

SUMMARY

This specification relates to surface modelling in computer graphics applications, such as computer generated animation and computer aided design of physical structures to be manufactured using additive manufacturing, subtractive manufacturing and/or other manufacturing systems and techniques, in which smoothness between a set of adjoining regions (surface patches, curves, functions, etc.) is improved. Particular embodiments of the subject matter described in this specification can be implemented to realize one or more of the following advantages. The details in a complex modelled surface (including the overall shape and areas of high curvature) can be preserved more effectively while smoothing that complex modelled surface. Focusing on continuity of adjoining regions enables smoothing without creating a blurring effect in the modelled surface. Note that having high continuity between regions does not require the removal of high-frequency variation, so the resulting smoothed transitions can retain the definition of the input. The smoothing effect is still pronounced as the transitions between neighboring regions becomes visibly smoother as continuity is improved.

Not all high-frequency variation in the surface definition is assumed to be "noise", which leads to better automatic preservation of high-curvature details in the surface while also smoothing the surface. This can be of particular value for generatively designed surfaces, where straying too far from the generative design output is undesirable, but reducing the bumps from the raw output is often necessary to achieve the desired shape, and smoothing using traditional 3D model editing tools is very time consuming for the user. Thus, providing a user interface tool that automatically smooths the generative design output, while preserving detail and not straying very far from the design that has been optimized for specific loading cases, makes the generative design output more usable.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
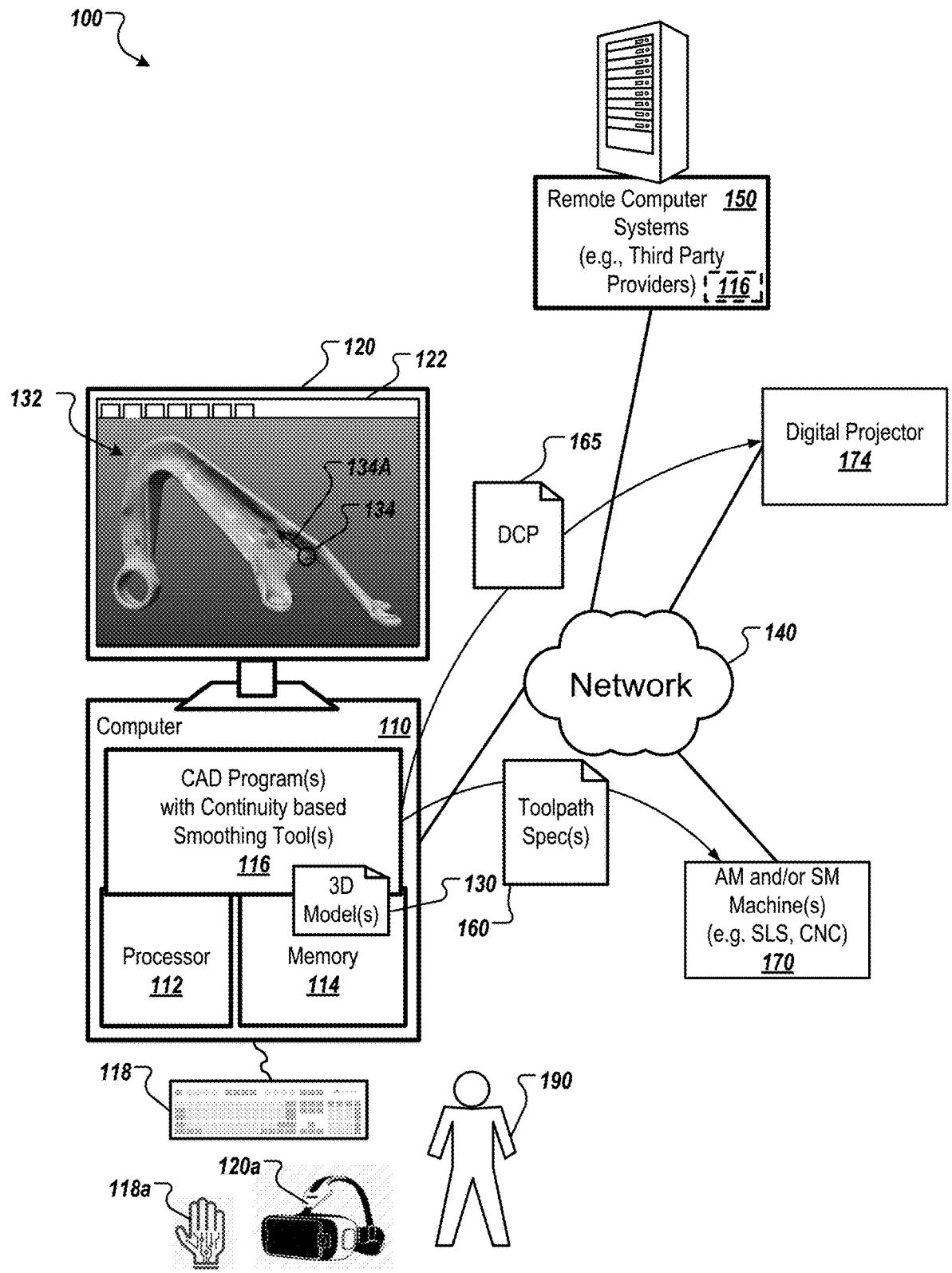
FIG. 1 shows an example of a system usable to design and manufacture physical structures, and/or generate computer animation, in which continuity based smoothing is used.

FIG. 1 shows an example of a system 100 usable to design and manufacture physical structures, and/or generate computer animation, in which continuity based smoothing is used. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions, including one or more tools for continuity based smoothing.

As used herein, "a CAD program" refers to any suitable program used to design physical structures that meet specified design requirements, regardless of whether or not the program is capable of interfacing with and/or controlling specific manufacturing equipment. Thus, CAD program(s) 116 can include Computer Aided Industrial Design (CAID) program(s), Computer Aided Engineering (CAE) program(s), Computer Aided Manufacturing (CAM) program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that a program 116 operating locally at computer 110 can offload processing operations (e.g., generative design and/or smoothing) "to the cloud" by having one or more programs 116 on one or more computers 150 perform the offloaded processing operations.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) or augmented reality (AR) system. For example, the input/output devices 118, 120 can include a VR/AR input glove 118a and/or a VR/AR headset 120a.

As noted above, the CAD program(s) 116 implement 3D modeling functions, which means a 3D model 132 can be built using the CAD program(s) 116. The CAD program(s) 116 can implement physical simulation (locally and/or by remote procedure call) to assist in building the 3D model 132. Physical simulations, such as finite element analysis (FEA), Computational Fluid Dynamics (CFD), Acoustics/Noise Control, thermal conduction, and/or computational injection molding simulations are often integral components in CAD-based product development. The CAD program(s) 116 can be used to build precise geometric descriptions of the design model, while physical simulations enable improved performance without time consuming physical testing.

The CAD program(s) 116 can provide user interface elements that enable the user to specify inputs for physical simulation(s), such as materials and loading cases for the 3D model(s) 132, where the loading cases define loads in different directions to be borne by a part being designed during use of the part. Thus, a user 190 can interact with the UI 122 of the CAD program(s) 116, including producing a full mechanical problem definition for a part to be manufactured, so as to build and modify 3D model(s) 132, which can be stored in 3D model document(s) 130. In the example of FIG. 1, the 3D model 132 is of a specific bracket design, but this is merely one of many possible 3D models that can be designed and smoothed using the systems and techniques described herein.

In the example shown, the 3D model 132 rendered to the display device 120 in the UI 122 is a complex T-Spline surface model that is the output result from a generative design process. In addition to traditional CAD modelling/editing tools, the CAD program(s) 116 also provide one or more continuity based surface smoothing tools, which can include a UI 122 button to perform continuity based smoothing on the entire 3D model, a UI 122 bounding box tool to select a subset of control vertices from the 3D model 132 to provide as input to a continuity based smoothing operation, and/or a UI 122 brush tool (with a user controlled brush size, shown as brush region 134) that the user 190 can move 134A across portions of the model 132 to select control vertices from the 3D model 132 to provide as input to a continuity based smoothing operation, as described in further detail below.

In addition, in some implementations, the CAD program(s) 116 implement manufacturing control functions. Once the user 190 is satisfied with a 3D model 132, the 3D model 132 can be stored as the 3D model document(s) 130 and/or used to generate another representation of the model (e.g., an .STL file for additive manufacturing). This can be done upon request by the user 190, or in light of the user's request for another action, such as sending the 3D model 132 to additive manufacturing (AM) machine(s) and/or subtractive manufacturing (SM) machine(s) 170, or other manufacturing machinery, which can be directly connected to the computer 110, or connected via a network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the CAD program(s) 116 can provide a document 160 (having toolpath specifications of an appropriate format) to an AM and/or SM machine 170 to produce a physical structure corresponding to at least a portion of the 3D model 132. An AM machine 170 can employ one or more additive manufacturing techniques, such as granular techniques (e.g., Powder Bed Fusion (PBF), Selective Laser Sintering (SLS) and Direct Metal Laser Sintering (DMLS)), extrusion techniques (e.g., Fused Deposition Modelling (FDM), which can include metals deposition AM). In some cases, the AM machine 170 builds the physical structure directly, and in some cases, the AM machine 170 builds a mold for use in casting or forging the physical structure. In addition, the user 190 can save or transmit the 3D model 132 for later use. For example, the CAD program(s) 116 can store the document(s) 130 that includes the 3D model 132.

An SM machine 170 can be a Computer Numerical Control (CNC) milling machine, such as a multi-axis, multi-tool milling machine used in the manufacturing process. For example, the CAD program(s) 116 can generate CNC instructions for a machine tool system 170 that includes multiple tools (e.g., solid carbide round tools of different sizes and shapes, and insert tools of different sizes that receive metal inserts to create different cutting surfaces) useable for various machining operations. Thus, in some implementations, the CAD program(s) 116 can provide a corresponding document 160 (having toolpath specifications of an appropriate format, e.g., a CNC numerical control (NC) program) to the SM machine 170 for use in manufacturing the physical structure using various cutting tools, etc.

In some implementations, the CAD program(s) 116 provide instructions to build a workpiece in a first stage of manufacturing, e.g., using direct AM and/or using forging and/or casting methods, and the CAD program(s) 116 also provide instructions to machine the workpiece, e.g., roughing and/or finishing operations, in a second stage of manufacturing, e.g., in a 3-axis CNC milling system, in order to form the completed structure. In general, various different manufacturing systems and techniques can be employed, either alone or in combination, to produce a final structure, and the CAD program(s) 116 can include suitable algorithms to generate toolpath specifications 160 for one or more of these various systems to manufacture a part that has been designed using the systems and techniques described in this application.

In addition, in some implementation, no physical manufacturing is involved. The systems and techniques described herein are applicable to any suitable surface modelling software. Thus, in some implementations, the CAD program(s) 116 can be animation production programs that render the 3D model 132 to a document 165 of an appropriate format for visual display, such as by a digital projector 174 (e.g., a digital cinema package (DCP) 165 for movie distribution) or other high resolution display device. Other applications are also possible.

Figure 2:
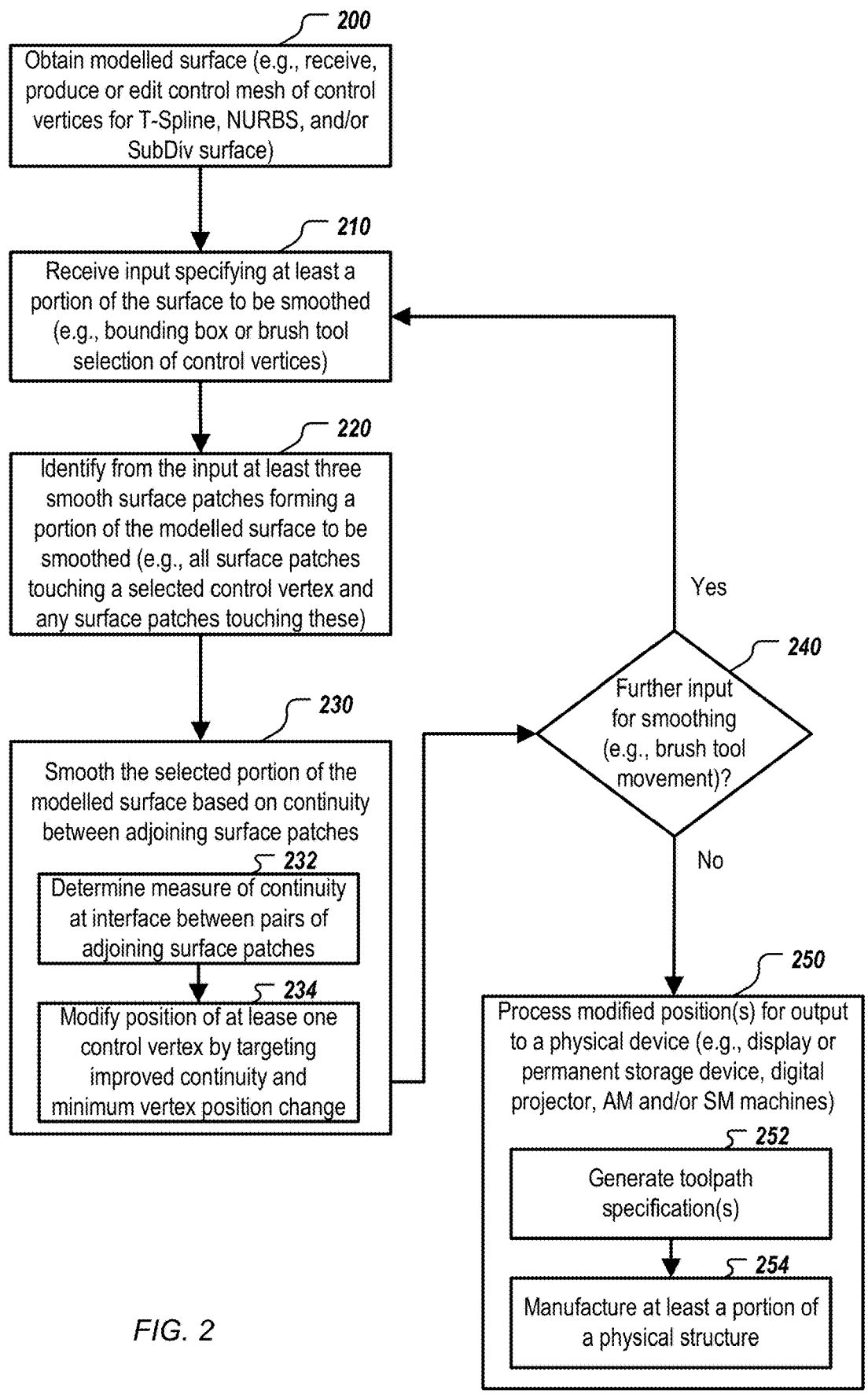
FIG. 2 shows an example of a process to smooth a surface in a 3D model before output to a physical device.

FIG. 2 shows an example of a process, e.g., performed by CAD program(s) 116, to smooth a surface in a 3D model before output to a physical device. A modelled surface is obtained 200, where the modelled surface includes a control mesh of control vertices. This can involve receiving the modelled surface from another process, e.g., a generative design process, or producing and/or editing the modelled surface based on user input, e.g., input received from user 190 through input device(s) 118. In addition, the modelled surface is complex in that the control vertices define multiple smooth surface patches that compose the modelled surface. For example, the modelled surface can include T-Splines, NURBS, Subdivs, Béziers, B-Reps, etc. In addition, the modelled surface can be a portion of larger 3D model composed of multiple surfaces, which can be defined using different boundary representation formats or other 3D data modelling formats.

Input specifying at least a portion of the modelled surface to be smoothed is received 210, e.g., by CAD program(s) 116. This can involve receiving input from a bounding box or brush UI tool. From the input, at least three of the multiple smooth surface patches corresponding to the at least a portion of the complex modeled surface to be smoothed are identified 220, e.g., by CAD program(s) 116. For example, one or more control vertices in the control mesh can be selected based on the input from the user, all the surface patches that touch the one or more selected control vertices can be identified, and all the surface patches that touch these identified surface patches can also be identified, in order to determined how many faces of the 3D model are affected by the smoothing operation.

Figure 4A:
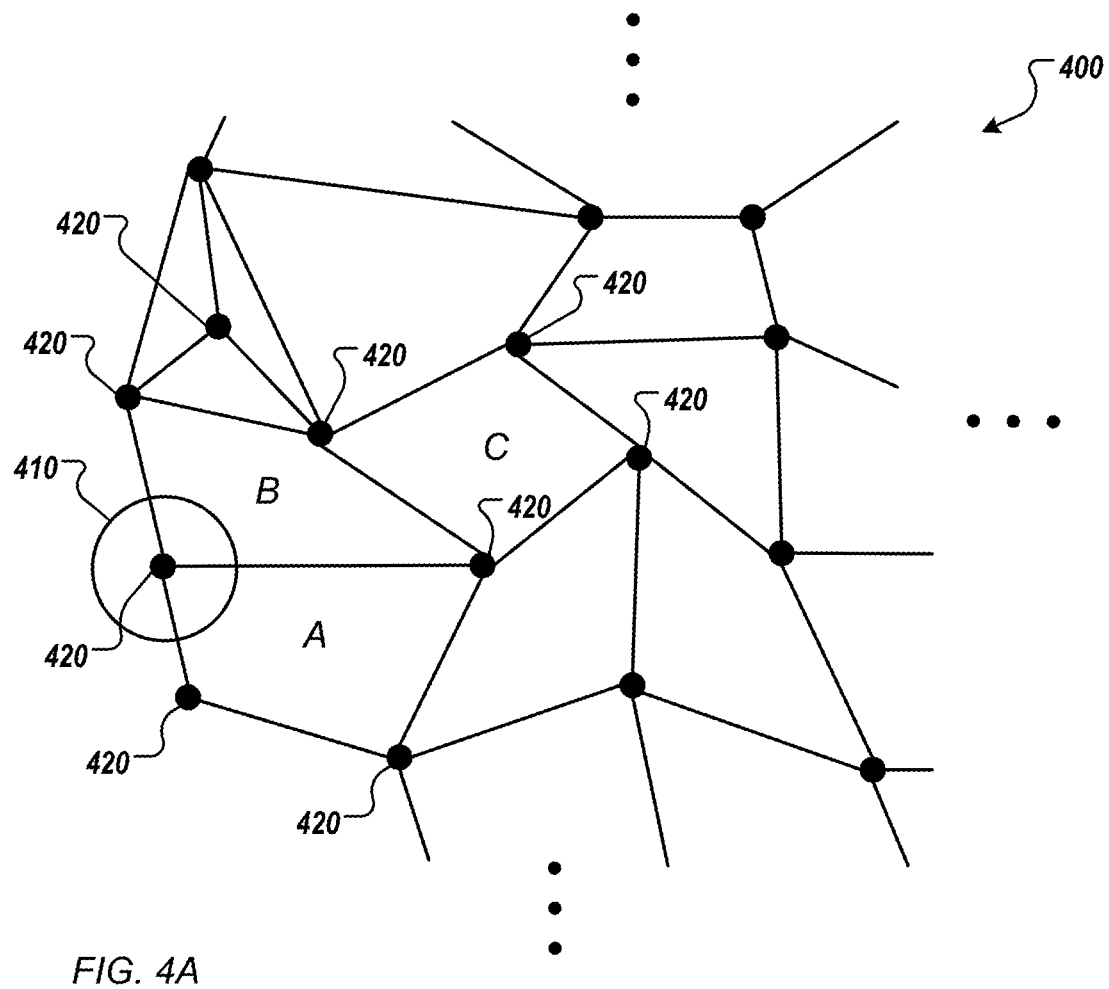
FIG. 4A shows an example of a portion of a control mesh for a complex modelled surface.

Thus, in the example case of cubic Subdivision surfaces and cubic NURBS surfaces, two rings out from the one or more selected control vertices are taken, in view of the local topology in the 3D model. For example, FIG. 4A shows a portion of a control mesh 400 for a complex modelled surface. A region 410 of a brush tool has selected a single control vertex in the control mesh 400. As a result of the local topology, there are two surface patches A, B that touch this selected vertex, and three additional surface patches (including surface patch C) that touch these two surface patches A, B. This set of five surface patches are defined by nine control vertices 420, which are then the control mesh inputs to a smoothing algorithm. Alternatively, in some implementations, the one or more control vertices selected by the user are the control mesh inputs to the smoothing algorithm, and it is the smoothing algorithm itself that identifies affected patches and thus the control vertices 420.

Further, as will be appreciated, as control vertices that are extraordinary points can also be handled by the described processes (with or without flattening), and as the local topology can be at the edge of a modelled surface, the minimum number of control vertices affected can be six (e.g., defining three patches around an extraordinary point, plus one regular patch adjoining one of these three patches) and the minimum number of surface patches affected can be three (e.g., three regular patches in a row or in an L shape, defined by eight control vertices). In this context, the surface patches are defined by the control vertices in the sense that the control vertices provide the three dimensional locations of the control points of the control mesh faces, but as will be appreciated, each surface patch is fully defined (i.e., all of its properties are defined mathematically) by the set of all control vertices in the control mesh that influence or affect that surface patch, in view of the particular surface definition format being used. A typical bi-cubic surface patch with four corners is defined by sixteen control points, which can be calculated from many control vertices in the control mesh, whereas a single barycentric triangular patch is defined by three control points. The actual number of control points which define each surface patch and the minimum number of control points are dependent on the specifics of each surface implementation.

Note that most selections for smoothing will include at least three surface patches, which are defined by at least eight of the control vertices from the control mesh, in the case of regular surfaces defined by ordinary control vertices, but this is not required. The described processes will work with many more faces (including potentially all the faces of the complex modeled surface) as well as fewer, including the case of a single control vertex being selected at the edge of a modelled surface, resulting in only two faces being processed to smooth two adjoining surface patches of the modelled surface. Various lower bounds are possible, depending on the context of implementation. For example, the described systems and techniques can be used to smooth tetrahedrons or triangles extruded to cylinders.

In addition, the details above are just some examples of possible implementations. In some implementations, any vertex under the brush tool is taken and sent to the smoothing routine that performs the smoothing algorithm, which can operate on these vertices in the same manner as when operating on control vertices selected by a bounding box tool. In the case of a brush tool, the selection and sending of control vertices to the smoothing routine can be done every time the brush moves, which allows the user to brush over each area they want to smooth, which thus advantageously allows the user to control both what is selected and how long to iterate on that area. But regardless of the UI selection method, the control vertices can be provided to the algorithm and the surface patches affected by those control vertices are the ones used to measure continuity.

Various implementations are possible, but in general, all surface patches whose shape is fully or partially controlled by the input vertices can be identified, and from these surface patches, a set of control points which are sufficient to fully control the shape of all these surface patches can be identified. These control points can then be processed using the systems and techniques described herein to smooth the selected region of the complex surface. Note that those skilled in the art will understand the variety of ways to identify which surface patches are controlled by the selected vertices, and likewise how to measure continuity for those surface patches, depending on the particular 3D modelling surface format(s) being used in a given implementation.

Returning to FIG. 2, the selected portion (which can be all) of the complex modeled surface is smoothed 230, e.g., by CAD program(s) 116, based on continuity between adjoining surface patches. A measure of continuity at an interface between each pair of adjoining surface patches from the at least three surface patches is determined 232. For example, each surface patch can be a degree 3 surface, e.g., a bi-cubic Bézier patch, either in the 3D model or generated from it, where the interface between two such degree 3 surfaces is a shared edge having only $C^2$ continuity, and a reverse (or inverse) of the de Casteljau algorithm can be used as a measure of improved continuity at the shared edge of each pair of adjoining degree 3 surfaces. In general, the common derivatives are measured at the meeting point of the two functions.

In addition, positions of at least a subset of the at least eight control vertices are modified 234. In some implementations, only the input control vertices can be moved by the smoothing routine. In some implementations, the smoothing routine can also move additional control vertices that were used by the solver when optimizing continuity at the surface patch interfaces. At a minimum, at least one control vertex is moved to improve the smoothness of at least two surface patches, but in general, more control vertices are repositioned. Regardless of how many control vertices are modified 234, the surface patches are also necessarily modified, as the control vertices define the surface patches. Furthermore, the modifying 234 targets an overall improvement in the measures of continuity for the interfaces between the pairs of adjoining surface patches, while also targeting an overall minimum of modification of positions of the selected control vertices.

After the smoothing 230, a check can be made 240 for additional input to be processed, such as further input from a brush UI tool. Note that the user can move the brush tool back and forth over the same region of the 3D model to further smooth that region, as desired. Moreover, the user is free to set an amount (percentage) of smoothing to perform during each smoothing operation, as described in further detail below. Thus, the user is given extensive control over where and how much to smooth the various surfaces of the 3D model.

In addition, after one or more smoothing 230 operations are performed, the modified positions of the at least a subset of the control vertices (e.g., at least one of at least eight control vertices) within the control mesh of the complex modelled surface are processed 250 for output by a physical device. The physical device can be a display device, e.g., display device 120, and the processing 250 can include rendering, e.g., by CAD program(s) 116, at least the modified portion of the modelled surface in the 3D model to the display device. In this case, the check 240 is performed after the processing 250. Thus, the smoothing tool can be used interactively by the user to smooth the 3D model in desired locations, view the modified 3D model, and then perform more smoothing 230, as desired. Using this approach to smoothing in combination with known undo operations in computer modeling user interfaces provides the user with a highly flexible and versatile smoothing UI.

In addition, the physical device can be a permanent storage device, and the processing 250 can include rendering the modified 3D model to an output document stored in the permanent storage device, e.g., for use in manufacturing a physical structure corresponding to the modeled object using the one or more computer-controlled manufacturing systems, e.g., AM machine(s) and/or SM machine(s) 170, and/or other manufacturing machines. The physical device can be a digital projector, and the processing 250 can include rendering the modified 3D model to an animation document, e.g., DCP 165, for the digital projector, e.g., digital projector 174.

Moreover, the physical device can be one or more computer-controlled manufacturing systems including an additive manufacturing machine or a subtractive manufacturing machine, and the processing 250 can include causing manufacturing of at least a portion of the modified 3D model using the one or more computer-controlled manufacturing systems, e.g., AM machine(s) and/or SM machine(s) 170, and/or other manufacturing machines. For example, the processing 250 can include generating 252, e.g., by CAD program(s) 116, toolpath specifications for the computer-controlled manufacturing system(s) (e.g., AM machine(s) and/or SM machine(s) 170) using the modified 3D model, and manufacturing 524, e.g., by CAD program(s) 116, at least a portion of the physical structure corresponding to the modified 3D model with the computer-controlled manufacturing system(s) (e.g., AM machine(s) and/or SM machine(s) 170) using the toolpath specifications generated for the manufacturing machine (e.g., AM machine(s) and/or SM machine(s) 170).

Figure 3:
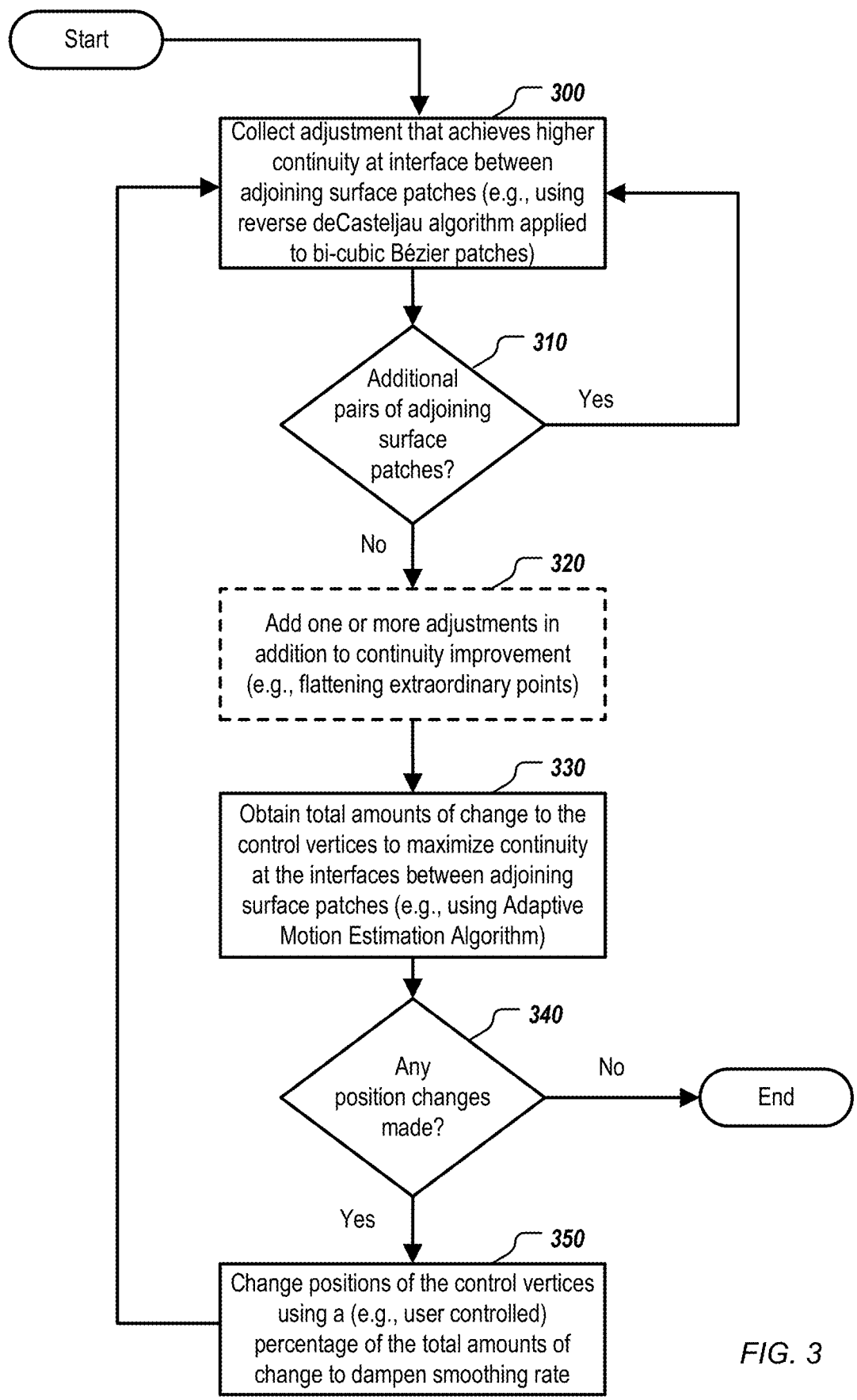
FIG. 3 shows another example of a process to smooth a modelled surface.

FIG. 3 shows another example of a process, e.g., performed by CAD program(s) 116, to smooth a modelled surface. For example, the process of FIG. 3 can be the smoothing 230 of FIG. 2. Adjustments to adjoining surface patches that achieve higher continuity at an interface between the adjoining surface patches are collected 300. For example, each adjoining surface patch can be a bi-cubic Bézier surface patch (either in the 3D model or generated from it), and a reverse (or inverse) of the de Casteljau algorithm can be used as a measure of improved continuity at the interface between the adjoining bi-cubic Bézier surface patches.

However, this is but one example. The adjoining surface patches need not be degree 3 surfaces, which have 4×4 control points (16 total control points), but rather can be higher degree surfaces, such as degree 7 surfaces, which have 8×8 (64) control points, or even lower degree surfaces, such as quadratic surfaces. The surface patches can be NURBS surfaces of any suitable degree. Any suitable subdivision scheme can be used, in which the surface can be decomposed into surface patches for which continuity may be measured. For example, Non-uniform Rational Catmull-Clark Surfaces, Catmull-Clark subdivision surfaces, Doo-Sabin subdivision surfaces, and subdivision schemes that produce limit surfaces that have degrees other than quadratic and cubic can also be used. Further, arbitrary degree T-Spline surfaces, point-based splines, or similar surface technologies where control point behavior can be described with blending functions whose continuity can be measured, can also be used the systems and techniques described in this specification. The surface patches can be triangular Bézier patches, Coons patches, algebraic surfaces, bi-cubic Catmull-Rom splines, as well as other possibilities.

Moreover, while the details example provided takes the difference of the 3rd derivative on each side and puts this into the solver to optimize while staying as close as possible to the current vertex positions, other algorithms can be used to measure the continuity at the interface between the adjoining surface patches and to determine how to modify the shapes of the two surface patches (e.g., by moving their control points) to improve continuity at the interface. In general, $C^n$ parametric continuity means that n derivatives match across the interface. Thus, the derivatives represent the measure of continuity, and various algorithms to position control points to improve continuity can be used, as will be appreciated by those skilled in the art.

The goal of the adjustments collected 300 is to match the continuity to degree of the two surfaces, such as achieving $C^3$ continuity at the interface between degree three surfaces, so the continuity can be considered as infinite continuity, or C-infinity. The adjustment should seek to make the difference between the derivatives become zero at the interface (e.g., by making adjustments to the arrangement of control points) no matter how many times the derivative of the two functions defining the two adjoining surface patches is taken. In other words, once the continuity is matched to the degree of the surface, then the continuity is said to be infinite because any further continuity measures will always match.

A check is made 310 for any additional pairs of adjoining surface patches, and additional adjustments are collected 300, while additional pairs remain. Note that the adjustments for each pair of surface patches can be reduced to a single difference measure between the current measure of continuity at the interface and the ideal continuity at the interface, and this difference (or delta) between the two can be the measure of continuity for the interface that is to be optimized. In any case, in some implementations, once all the adjustments are collected 300, one or more additional adjustments (in addition to continuity improvement) are added 320. These additional adjustment(s) can each likewise be a single value to be optimized. In other words, at least one additional constraint for the (at least a portion of) the complex modelled surface can be targeted during the smoothing operation.

For example, the additional adjustment(s) can include flattening 320 of extraordinary points in the control mesh. Note that an extraordinary point is (1) a vertex on the control mesh where N control faces meet, in the mesh interior, and N is not equal to four, and also (2) a vertex on the control mesh where N control faces meet, at the mesh boundary, and N is greater than two. Note that an extraordinary point is also often referred to as a star point or a pole point, as this is descriptive of the shape seen by users in the control mesh.

In some implementations, flattening of extraordinary points is the only additional constraint, as the results of using just these three targets (infinite continuity, minimal control vertex movements, and flatter surfaces around extraordinary points) has been found to be very effective at smoothing complex modelled surfaces. However, other targets are also possible. For example, as shown in the pseudocode below, the program can be designed to readily accept additional constraints in the optimization process that effects the smoothing. In general, the optimization is performed so as to attempt to satisfy multiple competing targets, and in most cases, an ideal result will not be achieved across all the surface patches due to the competing targets, but the process will seek the best compromise to get to as close to infinite continuity across the complex modelled surface as possible.

Regardless of whether or not additional adjustments/ targets/constraints are used, total amounts of change to the selected control vertices of the control mesh are obtained 330 so as to maximize continuity at the interfaces between the adjoining surface patches. In some implementations, this involves using the Adaptive Moment Estimation (Adam) algorithm to maximize continuity at the interfaces between the adjacent surface patches. For example, the "optimize" operation in the pseudocode below can use the Adam algorithm. Other optimization algorithms are also possible, such as least squares, gradient descent, stochastic gradient descent, AdaGrad, AdaDelta, AdaMax, FTRL (Follow the Regularized Leader), RMSProp (Root Mean Square Propagation), and Nadam (Adam with Nesterov momentum) algorithms. Nonetheless, using Adam has been found to be a good choice of optimization algorithm given its machine learning approach to optimization, which tends to converge on a solution quickly without getting stuck in local minima.

A check 340 determines whether any changes have been made (e.g., within the machine precision of the computer) by the optimization algorithm to the positions of the control vertices. If not, the process ends. While further changes are possible, the process changes 350 the positions of the control vertices using a percentage of the total amounts of change. This percentage is less than (or equal to) one hundred percent. For example, the percentage can be twenty five percent. Other percentages are also possible, and the percentage change amount can be made a user controlled variable. Note that the optimization algorithm necessarily makes trade-offs when arriving at a proposed solution. Thus, while there can be a single perfect solution for infinite continuity between each pair of surface patches, there is not likely to be a single perfect solution for the entire system of surface patches, as making the continuity between one pair better can make the continuity between another pair worse. Because of this, dampening the rate of smoothing can be advantageous, as going only part of the way to a currently proposed ideal solution changes the control mesh and thus the inputs to a new round of optimization. In other words, an iterative approach to the continuity based smoothing can result in an improved final result. Note that this iterative approach is distinct from the use of an iterative solver for the obtaining 330, which can find the best possible solution to the input system of equations given any time constraints for finding that solution.

Moreover, dampening the smoothing rate (e.g., adjusting only part of the way to the proposed ideal result) can be advantageous even when the process does not iterate back to collecting 300. For example, the user can set the percentage (and thus the dampening rate) to a desired number to control the amount of smoothing performed per operation (e.g., per brush stroke) to provide much finer control over how much to smooth in which portions of the complex modelled surface. Moreover, in some implementations, two percentages are used, one or both of which be user controlled: a first percentage that indicates how far to move toward the ideal solution in each iteration of changing positions 350, and a second percentage that indicates how much to move the control vertices toward the initially obtained 330 totals before terminating 340 the loop for a current smoothing operation (e.g., a current painting motion of the smoothing brush). Thus, a new smoothing user interface can be provided, giving CAD software an ability to smooth complex modelled surfaces in a way that was not possible before.

Figure 4B:
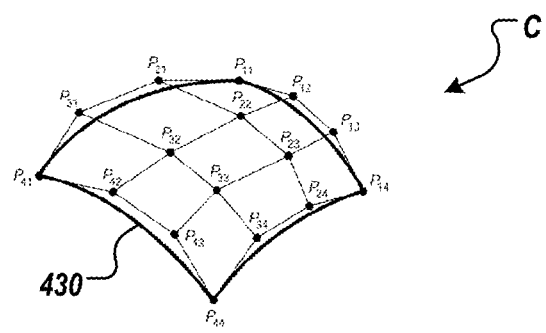
FIG. 4B shows an example of control points for a surface patch from the complex modelled surface of FIG. 4A.

The following pseudocode represents an example implementation of the continuity based smoothing. Note that this example can operate with multiple different source formats for the surface patches, as each surface patch can be converted to a bi-cubic Bézier surface patch to obtain the control points used as inputs to the optimization process. FIG. 4B shows an example of control points $P_{11}$, $P_{12}$, $P_{13}$, $P_{14}$, $P_{21}$, $P_{22}$, $P_{23}$, $P_{24}$, $P_{31}$, $P_{32}$, $P_{33}$, $P_{34}$, $P_{41}$, $P_{42}$, $P_{43}$, $P_{44}$, for a bi-cubic Bézier surface patch generated from surface patch C from the complex modelled 400 surface of FIG. 4A, as well as the smooth surface 430 defined by those control points. Surface patch B will have its own corresponding set of control points, and the adjustment of these various control points that maximizes the continuity between adjoining surface patches B, C is the target continuity measure for the optimization process. Note however that this conversion to bi-cubic Bézier surfaces is not required, as the source formats can be operated on directly.

Pseudocode

```
smooth( vertices, rate )
{
    // A is a matrix where each column is a vertex and each row is a constraint
    // b is a vector of points with same number of rows as A
    clear( A, b )
    patches = patches_affected_by( vertices )
    // Minimize difference in 3rd derivative (1st and 2nd derivatives already match)
    foreach(patch1, patch2 : adjoining_patches( patches ) )
    {
        foreach( row : 0..3 )
        {
            // If have already processed this row of control points when working
            // with a neighboring pair of patches, don't add the constraint again
            if( previously_visited( row, patch1, patch2 ) )
                continue
            // Gather linear combinations of control points for the common row across
            // the pair of patches
            C0..C7 = row_linear_combinations( row, patch1, patch2 )
            // Gather the rational weights for the evaluated points of each linear
            // combination C0..C7
            w0..w7 = weights( C0..C7 )
            // Gather the parametric width of each patch
            dt1 = param_width( patch1 )
            dt2 = param_width( patch2 )
            // Find the difference between the 3rd derivatives of patch1 and patch2
            // From "Rational Bézier Patch Differentiation using the Rational
            // Forward Difference Operator", X. Chen, et. al., 2005.
            // c3_diff is a linear combination of control points
            c3_diff = ( ( C0 - 3*C1 + 3*C2 - C3 ) * w3 -
                        ( w0 - 3*w1 + 3*w2 - w3 ) * C3 )/( dt1^3 * w3^2 ) -
                      ( ( C4 - 3*C5 + 3*C6 - C7 ) * w4 -
                        ( w4 - 3*w5 + 3*w6 - w7 ) * C4 )/( dt2^3 * w4^2 );
            // Minimize error of c3_diff == 0
            A.add_row( c3_diff )
            b.add_row( 0 )
        }
    }
    // Flatten star points
    foreach( vertex : stars_in( vertices ) )
    {
        neighbors = neighboring_vertices( vertex )
        plane = best_fit_plane( neighbors )
        flat_point = closest_point( vertex, plane )
        A.add_row( linear_combination( vertex, 1 ) )
        b.add_row( flat_point )
    }
    // Add "anchor" constraints to keep close to the current location
    foreach( vertex : used_vertices( A ) )
    {
        A.add_row( linear_combination( vertex, 1 ) )
        b.add_row( vertex )
    }
    // Optimize A*vertices = b, w.r.t. minimizing the sum of the squared error
    // Use "Adam: A Method for Stochastic Optimization", D. Kingma & J Ba, 2015
    optimal_points = optimize( A, vertices, b )
    // Apply smoothing rate and move to the new location
    foreach( P0, P1 : vertices, optimal_points )
    {
        new_location = ( P0 * ( 1 - rate ) ) + ( P1 * rate )
        P0.set( new_location )
    }
}
```

Note in the example pseudocode above that an "anchor" constraint is used for the control vertices. Because the derivative information is positionless, it is independent of scale and location for the complex modelled surface. Thus, the optimization algorithm should balance improving continuity against also trying to keep the control vertices as close to their current positions as possible. This then serves as the anchor to the complex modelled surface, in place of trying to fit to specific positions on the surface itself, which is defined by those control vertices.

Figure 5A:
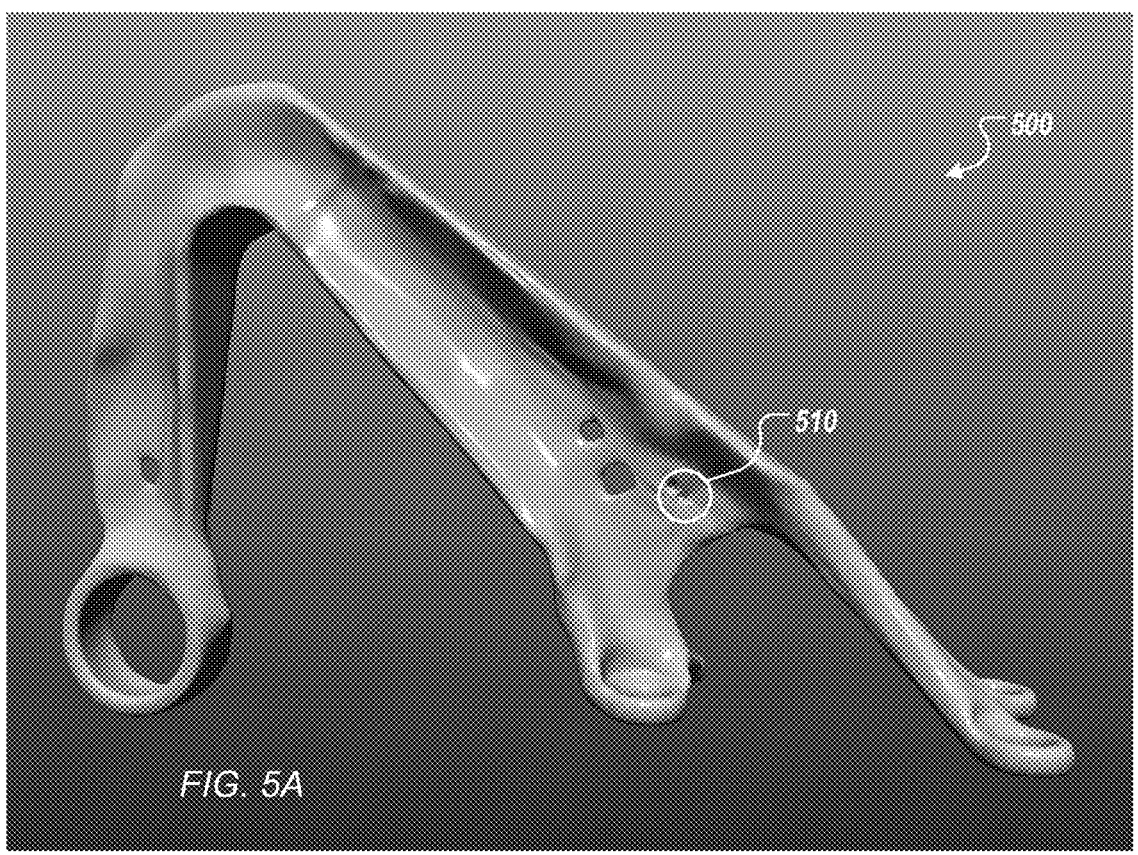
FIGS. 5A & 5B are graphical renderings showing a 3D model before and after continuity based smoothing.
Figure 5B:
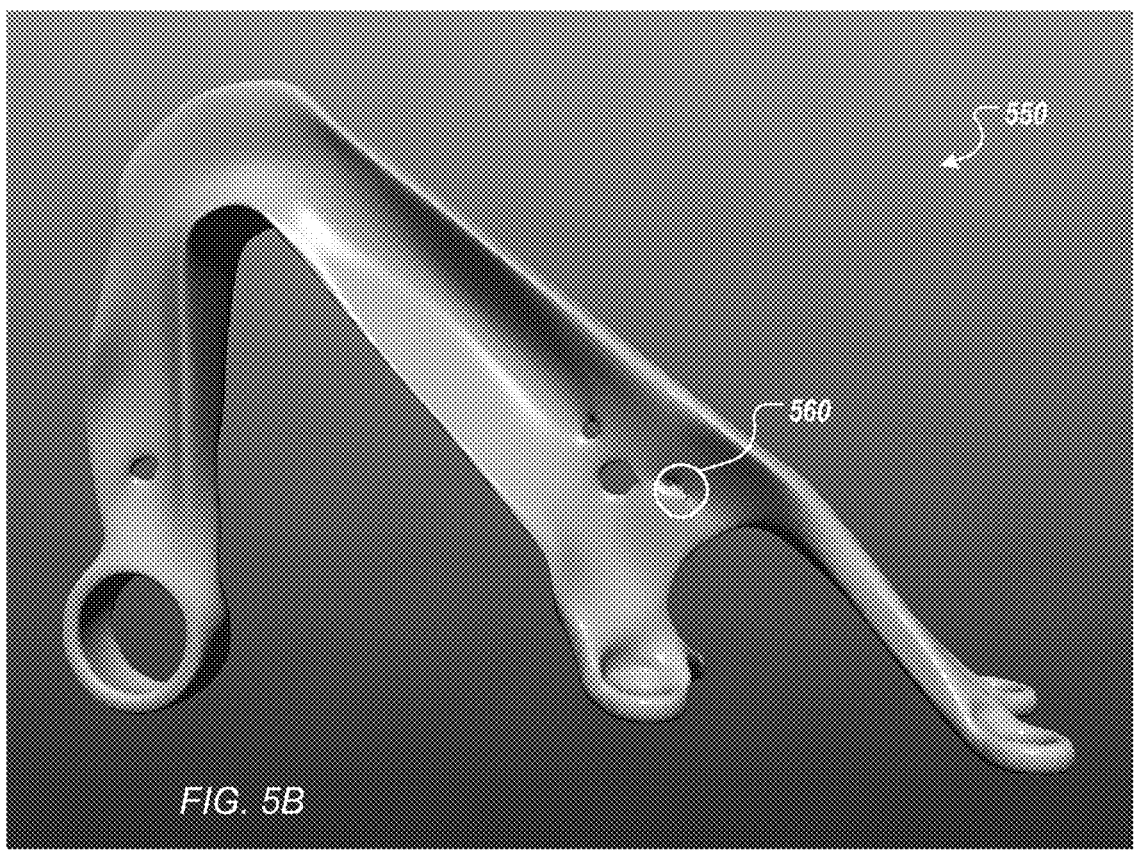

FIGS. 5A & 5B are graphical renderings showing a 3D model before 500 and after 550 continuity based smoothing. As shown, the 3D model 550 is smoother than the 3D model 500, but edges have not been blurred away. Note that, because the optimization process does not attempt to fit to specific positions on the smooth surface of the original 3D model 500, the process does not lead to overfitting, which can cause oscillations in the optimization process and lead to the appearance of undesirable bumps in the complex modelled surface, rather than a smoother surface overall. By fitting to continuity at the interfaces between the smooth surface patches, which is a much looser constraint than the surface positions themselves, the process moves consistently toward a smoother overall surface.

Figure 6A:
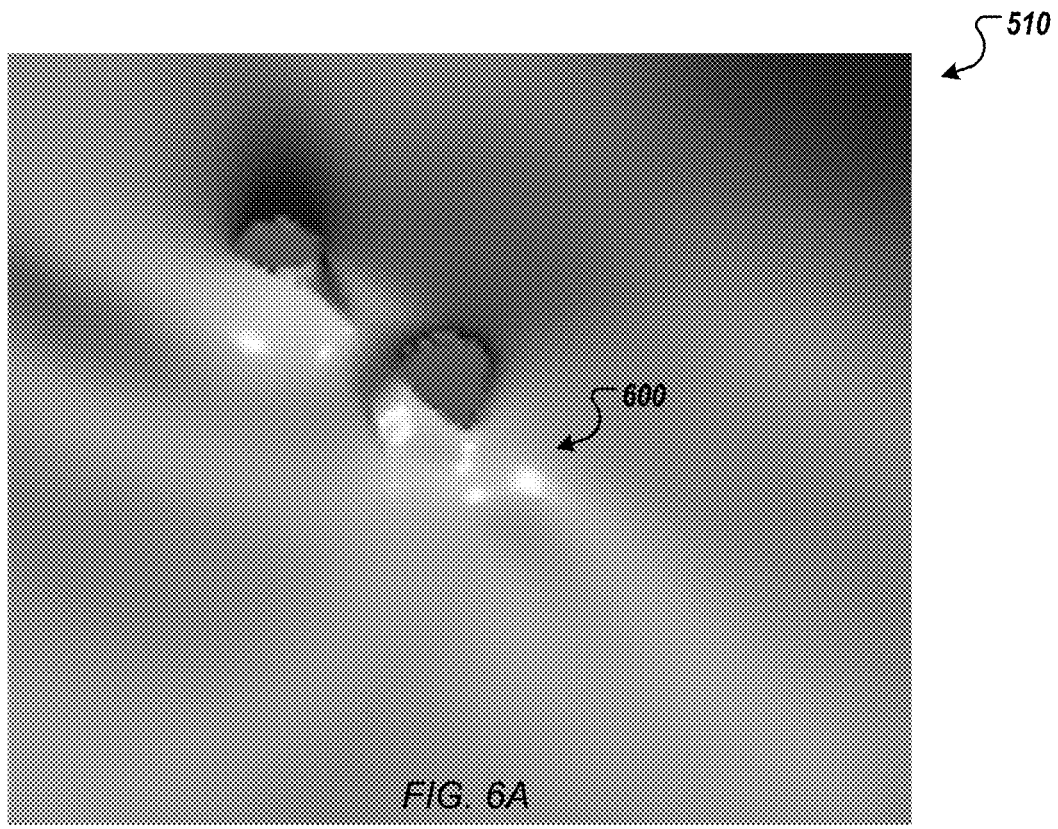
FIGS. 6A & 6B are graphical renderings showing details of the 3D model from FIGS. 5A & 5B before and after continuity based smoothing.
Figure 6B:
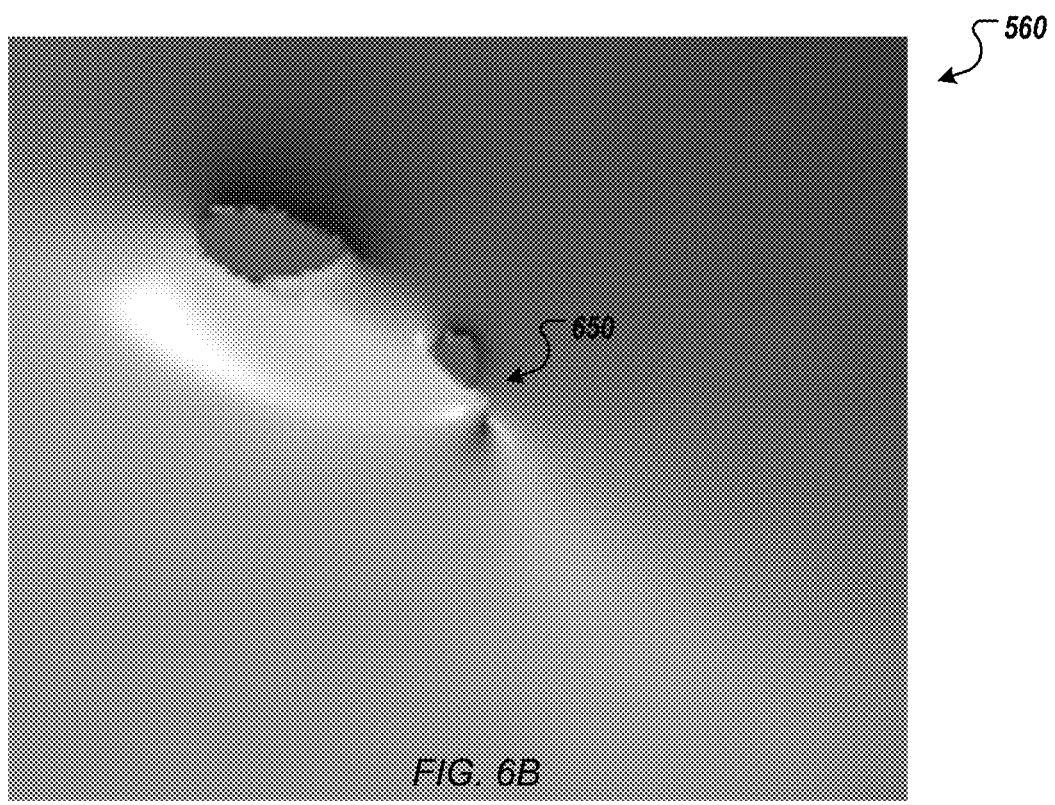

However, it should be noted that it is the complex modelled surface that is smoother overall in that bumps are not created across the larger complex surface. But what might be considered a "bump" can still be added in localized areas, depending on the topology and starting shape of the 3D model. For example, FIGS. 6A & 6B are graphical renderings showing details of areas 510, 560 of the 3D model before and after the smoothing results shown in FIGS. 5A & 5B. As shown in FIGS. 6A & 6B, a small "bump" 600 in one area of the original version of the 3D model has been made into a bigger "bump" 650 in the surface of the smoothed version of the 3D model. This is the natural result of the local topology and the surface patches that define it. Moreover, this bump was not really added, as it is simply the result of an increase in curvature of the bump that was already present in the 3D model.

Because improved continuity is targeted, rather than particular surface positions, the overall smoothness of the 3D model can be improved when small regions of the 3D model have their curvature increased. Note that improved continuity between surface patches allows for increased curvature. The amount of curvature over a region of a complex surface is independent of the amount of continuity at the interfaces between the surface patches from which that complex surface is composed. Thus, high curvature and high continuity can be present in the same complex surface. Thus, by targeting continuity as the measure of smoothness, rather than targeting reduced curvature, the feature details of the 3D model can be more readily preserved.

Unlike traditional approaches to smoothing, which can either lead to (1) blurring (where sharp edges are blurred away) or (2) undesirable bumpiness across the complex modelled surface (as a result of overfitting; attempting to fit the complex surface too tightly can lead to oscillations in the solution and thus a bumpening of the complex surface rather than a smoothing of the complex surface), the present approach is able to maintain a sharp surface definition, including well defined edges in the 3D model, while also smoothing the overall surface appearance, by increasing local curvature of the surface as needed. In other words, tighter curves can be created as part of the smoothing process, as the smoothing process can cause some surface patches to become more curved because this helps to improve the overall continuity for the set of patches, which runs counter to traditional approaches to smoothing. For example, in the case of bi-cubic Bézier patches, by targeting moving the control points by a delta from their current locations to new locations that result in higher continuity with their adjoining surface patches, and then solving globally over the set of surface patches to be smoothed, a very smooth complex surface is achieved overall, while details of surface curves are preserved, including increased local curvature as appropriate.

Moreover, while this approach also works around extraordinary points in the control mesh, experimentation showed that allowing an increase in curvature around extraordinary points can sometimes lead to results that do not appear as smooth as they should be. Thus, an additional constraint is added for extraordinary points. Around extraordinary points, it can be challenging to measure continuity usefully, and if no constraints are added for these regions, error in the optimization process can get concentrated around extraordinary points. Thus, in these regions of the control mesh, a flattening (i.e., a reduction in curvature) target is added to the optimization process, which prevents error being concentrated in these regions of the control mesh, as this additional constraint is balanced against the continuity constraint for the overall surface. As the described process is flexible enough to handle both targets, the two targets (continuity plus flattening around extraordinary points) can mix together and coexist, and this approach to smoothing can create an even better final result.

Figure 7:
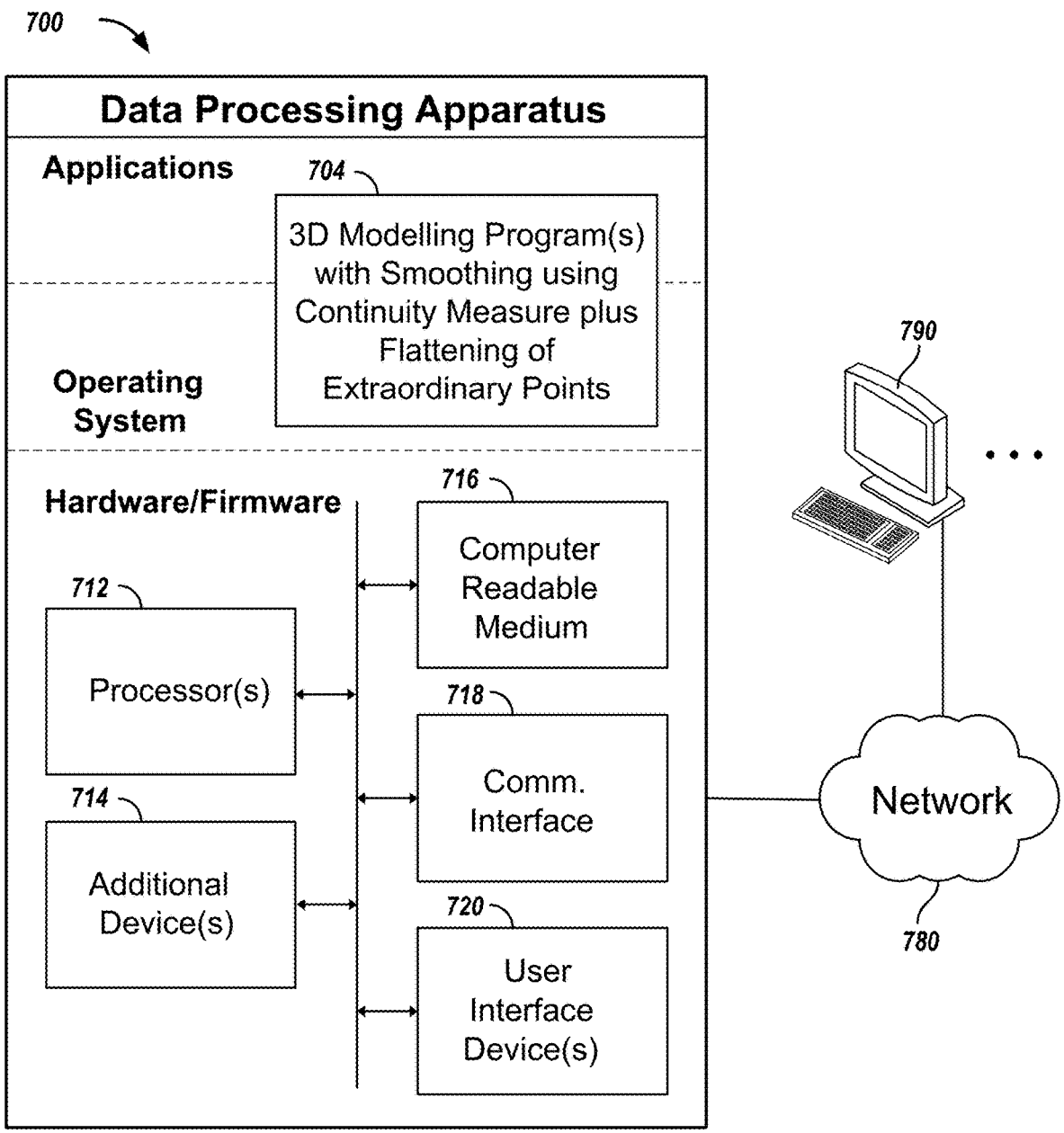
FIG. 7 is a schematic diagram of a data processing system including a data processing apparatus, which can be programmed as a client or as a server.

FIG. 7 is a schematic diagram of a data processing system including a data processing apparatus 700, which can be programmed as a client or as a server. The data processing apparatus 700 is connected with one or more computers 790 through a network 780. While only one computer is shown in FIG. 7 as the data processing apparatus 700, multiple computers can be used. The data processing apparatus 700 includes various software modules, which can be distributed between an applications layer and an operating system. These can include executable and/or interpretable software programs or libraries, including tools and services of one or more 3D modeling programs 704 that implement the systems and techniques described herein. Thus, the 3D modeling program(s) 704 can be CAD program(s) 704, computer animation program(s) 704, or other programs that implement continuity based smoothing as described in this specification. In addition, the 3D modelling program(s) 704 need not be limited to surface modelling, as the systems and techniques described in this specification are also applicable to curve modelling or other functions, where smoothing between the curves or functions is performed based on matching the continuity of the curves or functions at their interfaces.

In general, continuity based smoothing can be applied to adjoining regions, where "regions" are functions over a set domain with infinite internal continuity, including mathematical function in one dimension, parametric curves in two or three dimensions, and surface patches or volumes in three dimensions, an interface is the shared border between two regions which has continuity lower than infinity, and an adjustment used to inform the continuity based smoothing is a modification to the adjoining functions that would affect continuity at the interface. In other words, the systems and techniques described can be applied to various sets of adjoining functions in which each two adjoining functions meet at a given point where derivatives can be measured, and coefficients of each pair of adjoining functions can be adjusted to have matching derivatives at their shared point (using as many orders as desired). Other applications include illustration software (where user-drawn curves can be smoothed), animation software (where motion can be specified as a series of 3D curves and then smoothed), data analysis or signal processing software (where input data or an input signal can be approximated with a piecewise function, and the piecewise function can be smoothed at the interface between each segment), and software for editing terrain data (such as is used in architectural visualization or video games).

Further, the program(s) 704 can implement physical simulation operations (FEA or other), generative design operations (e.g., using level-set based method(s) for generative design), manufacturing control operations (e.g., generating and/or applying toolpath specifications to effect manufacturing of designed objects), and/or movie animation production. The number of software modules used can vary from one implementation to another. Moreover, the software modules can be distributed on one or more data processing apparatus connected by one or more computer networks or other suitable communication networks.

The data processing apparatus 700 also includes hardware or firmware devices including one or more processors 712, one or more additional devices 714, a computer readable medium 716, a communication interface 718, and one or more user interface devices 720. Each processor 712 is capable of processing instructions for execution within the data processing apparatus 700. In some implementations, the processor 712 is a single or multi-threaded processor. Each processor 712 is capable of processing instructions stored on the computer readable medium 716 or on a storage device such as one of the additional devices 714. The data processing apparatus 700 uses the communication interface 718 to communicate with one or more computers 790, for example, over the network 780. Examples of user interface devices 720 include a display, a camera, a speaker, a microphone, a tactile feedback device, a keyboard, a mouse, and VR and/or AR equipment. The data processing apparatus 700 can store instructions that implement operations associated with the program(s) described above, for example, on the computer readable medium 716 or one or more additional devices 714, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that produces an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:
   obtaining a complex modelled surface comprising a control mesh of control vertices, which define multiple smooth surface patches of the complex modelled surface;
   receiving input specifying at least a portion of the complex modelled surface to be smoothed;
   identifying from the input at least three of the multiple smooth surface patches corresponding to the at least a portion of the complex modeled surface to be smoothed, wherein the at least three surface patches are defined by at least eight of the control vertices from the control mesh;
   smoothing the at least a portion of the complex modeled surface based on continuity, wherein the smoothing comprises
      determining a measure of continuity at an interface between each pair of adjoining surface patches from the at least three surface patches, and
      modifying positions of at least a subset of the at least eight control vertices, thereby modifying the at least three surface patches, by targeting an overall improvement in the measures of continuity for the interfaces between the pairs of adjoining surface patches from the at least three surface patches, while also targeting an overall minimum of modification of positions of the at least eight control vertices; and
   processing the modified positions of the at least a subset of the at least eight control vertices within the control mesh of the complex modelled surface for output by a physical device.

2. The method of claim 1, wherein modifying the positions of the at least a subset of the at least eight control vertices comprises:
   obtaining total amounts of change to the at least a subset of the at least eight control vertices of the control mesh, wherein the total amounts of change maximize continuity at the interfaces between the adjoining surface patches; and
   changing the positions of the at least a subset of the at least eight control vertices using a percentage of the total amounts of change, wherein the percentage is less than one hundred percent.

3. The method of claim 2, wherein the smoothing comprises targeting at least one additional constraint for the at least a portion of the complex modeled surface.

4. The method of claim 3, wherein the at least one additional constraint comprises a flattening of one or more extraordinary points among the control vertices.

5. The method of claim 4, wherein the flattening is the only additional constraint, and the obtaining the total amounts of change comprises using Adaptive Moment Estimation to maximize continuity at the interfaces between the adjoining surface patches and to flatten the one or more extraordinary points, while minimizing modification of positions of the at least eight control vertices.

6. The method of claim 4, wherein the smoothing comprises iteratively repeating the determining and the modifying while changes to the positions of the at least a subset of the at least eight control vertices are still possible.

7. The method of claim 2, wherein the percentage is controlled by user input.

8. The method of claim 2, wherein receiving the input comprises receiving user input through a brush tool of a user interface of a computer aided design program, and the identifying comprises identifying the at least eight of the control vertices from the control mesh as those control vertices defining surface patches including a first set of surface patches touching any control vertex within a region of the brush tool and a second set of surface patches adjoining the first set of surface patches.

9. The method of claim 1, wherein the physical device comprises a display device, and processing the modified positions for output comprises rendering at least a portion of the complex modelled surface to the display device.

10. The method of claim 1, wherein the physical device comprises a permanent storage device, and processing the modified positions for output comprises rendering at least a portion of the complex modelled surface to an output document stored in the permanent storage device.

11. The method of claim 1, wherein the physical device comprises a digital projector, and processing the modified positions for output comprises rendering at least a portion of the complex modelled surface to an animation document for the digital projector.

12. The method of claim 1, wherein the physical device comprises one or more computer-controlled manufacturing systems comprising an additive manufacturing machine or a subtractive manufacturing machine, and processing the modified positions for output comprises:
 generating toolpath specifications for the additive manufacturing machine or the subtractive manufacturing machine using at least a portion of the complex modelled surface; and
 manufacturing at least a portion of a physical structure corresponding to the modified positions with the additive manufacturing machine or the subtractive manufacturing machine using the toolpath specifications generated for the additive manufacturing machine or the subtractive manufacturing machine.

13. A system comprising:
 a non-transitory storage medium having instructions of a computer aided design program stored thereon; and
 one or more data processing apparatus able to run the instructions of the computer aided design program to perform operations specified by the instructions of the computer aided design program to cause the one or more data processing apparatus to
 obtain a complex modelled surface comprising a control mesh of control vertices, which define multiple smooth surface patches of the complex modelled surface;
 receive input specifying at least a portion of the complex modelled surface to be smoothed;
 identify from the input at least three of the multiple smooth surface patches corresponding to the at least a portion of the complex modeled surface to be smoothed, wherein the at least three surface patches are defined by at least eight of the control vertices from the control mesh;
 smooth the at least a portion of the complex modeled surface based on continuity, wherein the instructions cause the one or more data processing apparatus to smooth the at least a portion of the complex modeled surface by causing the one or more data processing apparatus to
  determine a measure of continuity at an interface between each pair of adjoining surface patches from the at least three surface patches, and
  modify positions of at least a subset of the at least eight control vertices, thereby modifying the at least three surface patches, by targeting an overall improvement in the measures of continuity for the interfaces between the pairs of adjoining surface patches from the at least three surface patches, while also targeting an overall minimum of modification of positions of the at least eight control vertices; and
 process the modified positions of the at least a subset of the at least eight control vertices within the control mesh of the complex modelled surface for output by a physical device.

14. The system of claim 13, comprising one or more computer-controlled manufacturing systems comprising an additive manufacturing machine or a subtractive manufacturing machine, wherein the one or more data processing apparatus are able to run the instructions of the computer aided design program to generate toolpath specifications for the additive manufacturing machine or the subtractive manufacturing machine from at least a portion of the complex modelled surface, and to manufacture at least a portion of a physical structure corresponding to the modified positions with the additive manufacturing machine or the subtractive manufacturing machine using the toolpath specifications generated for the additive manufacturing machine or the subtractive manufacturing machine.

15. A non-transitory computer-readable medium encoding instructions operable to cause data processing apparatus to perform operations comprising:
 obtaining a complex modelled surface comprising a control mesh of control vertices, which define multiple smooth surface patches of the complex modelled surface;
 receiving input specifying at least a portion of the complex modelled surface to be smoothed;
 identifying from the input at least three of the multiple smooth surface patches corresponding to the at least a portion of the complex modeled surface to be smoothed, wherein the at least three surface patches are defined by at least eight of the control vertices from the control mesh;
 smoothing the at least a portion of the complex modeled surface based on continuity, wherein the smoothing comprises
  determining a measure of continuity at an interface between each pair of adjoining surface patches from the at least three surface patches, and
  modifying positions of at least a subset of the at least eight control vertices, thereby modifying the at least three surface patches, by targeting an overall improvement in the measures of continuity for the interfaces between the pairs of adjoining surface patches from the at least three surface patches, while also targeting an overall minimum of modification of positions of the at least eight control vertices; and
 processing the modified positions of the at least a subset of the at least eight control vertices within the control mesh of the complex modelled surface for output by a physical device.

16. The non-transitory computer-readable medium of claim 15, wherein modifying the positions of the at least a subset of the at least eight control vertices comprises:
 obtaining total amounts of change to the at least a subset of the at least eight control vertices of the control mesh, wherein the total amounts of change maximize continuity at the interfaces between the adjoining surface patches; and changing the positions of the at least a subset of the at least eight control vertices using a percentage of the total amounts of change, wherein the percentage is less than one hundred percent.

17. The non-transitory computer-readable medium of claim 16, wherein the smoothing comprises targeting at least one additional constraint for the at least a portion of the complex modeled surface.

18. The non-transitory computer-readable medium of claim 17, wherein the at least one additional constraint comprises a flattening of one or more extraordinary points among the control vertices.

19. The non-transitory computer-readable medium of claim 18, wherein the flattening is the only additional constraint, and the obtaining the total amounts of change comprises using Adaptive Moment Estimation to maximize continuity at the interfaces between the adjoining surface patches and to flatten the one or more extraordinary points, while minimizing modification of positions of the at least eight control vertices.

20. The non-transitory computer-readable medium of claim 18, wherein the smoothing comprises iteratively repeating the determining and the modifying while changes to the positions of the at least a subset of the at least eight control vertices are still possible.

* * * * *